United States Patent
Nakano et al.

(10) Patent No.: US 6,620,873 B2
(45) Date of Patent: Sep. 16, 2003

(54) PROCESS FOR PRODUCING RUBBER COMPOSITION AND RUBBER COMPOSITION

(75) Inventors: Sadayuki Nakano, Ichihara (JP); Takashi Nishida, Tokyo (JP)

(73) Assignees: Sumitomo Chemical Company, Limited, Osaka (JP); Nobukawa Rubber Industrial Co., Ltd., Tokyo (JP)

( * ) Notice: Subject to any disclaimer, the term of this patent is extended or adjusted under 35 U.S.C. 154(b) by 217 days.

(21) Appl. No.: 09/808,363

(22) Filed: Mar. 15, 2001

(65) Prior Publication Data

US 2001/0031815 A1 Oct. 18, 2001

(30) Foreign Application Priority Data

Mar. 16, 2000 (JP) ........................................ 2000-074076

(51) Int. Cl.⁷ ............................................. C08F 132/00
(52) U.S. Cl. .................... 524/424; 524/81; 525/232; 525/236; 525/237; 525/326.1
(58) Field of Search ................... 524/424, 81; 525/237, 525/236, 232

(56) References Cited

U.S. PATENT DOCUMENTS

| | | | | |
|---|---|---|---|---|
| 3,852,225 A | * | 12/1974 | Ishikawa et al. | 523/215 |
| 4,873,288 A | * | 10/1989 | Komatsu et al. | 525/194 |
| 4,966,940 A | * | 10/1990 | Tsuji et al. | 525/66 |
| 5,086,109 A | * | 2/1992 | Ueno et al. | 524/496 |
| 5,349,020 A | * | 9/1994 | Okada et al. | 525/237 |
| 5,585,424 A | * | 12/1996 | Ohata et al. | 524/264 |
| 5,696,214 A | * | 12/1997 | Sagane et al. | 526/170 |
| 6,433,089 B1 | * | 8/2002 | Nishihara et al. | 525/191 |

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

A rubber composition containing (A) an ethylene-α-olefin based copolymer rubber having an intrinsic viscosity [η] of 2.0–10.0 as determined in xylene at 70° C., (B) a softening agent, and (C) a filler, which composition is superior in heat resistance and fatigue resistance, is obtained by a process including the steps of dividing component (A) into portions (A1) and (A2), dividing component (B) into portions (B1) and (B2), dividing component (C) into portions (C1) and (C2), kneading portions (A1), (B1) and (C1) together to obtain a first blend, adding portions (A2), (B2) and (C2) to the first blend to obtain a second blend and kneading the second blend to obtain the rubber composition.

4 Claims, No Drawings

PROCESS FOR PRODUCING RUBBER COMPOSITION AND RUBBER COMPOSITION

FIELD OF THE INVENTION

This invention relates to a process for producing a rubber composition comprising an ethylene-α-olefin based copolymer rubber as the rubber component and a rubber composition obtained by the process. In more particular, it relates to a process for producing a rubber composition comprising an ethylene-α-olefin based copolymer rubber as the rubber component which is excellent in heat resistance and fatigue resistance as well as to a rubber composition obtained by the process.

BACKGROUND OF THE INVENTION

Previously, in the field of automobiles and industrial goods, ethylene-α-olefin copolymer rubbers or ethylene-α-olefin-non-conjugated diene rubbers typically represented by ethylene-propylene rubber (EPM) or ethylene-propylene-non-conjugated diene rubber (EPDM), respectively, have been in wide use by virtue of their desirable characteristic performances. In recent years, on the other hand, particularly in the automobile field, long-life automobile parts have been eagerly desired from the viewpoint of securing practically maintenance-free vehicles.

However, ethylene-α-olefin copolymer rubber and ethylene-α-olefin-non-conjugated diene copolymer rubber have a drawback in that they are inferior to natural rubber in reinforcing capability owing to the molecular weight and other factors, so that they are poor in fatigue resistance when subjected to repeated external force for a long time or to deformation under heavy load. Consequently, it has not been possible to use these rubbers under severe external force or severe deforming conditions.

SUMMARY OF THE INVENTION

In view of such situations, the object of this invention is to provide a process for producing a rubber composition comprising an ethylene-α-olefin based copolymer rubber as the rubber component which is excellent in heat resistance and fatigue resistance as well as a rubber composition obtained by the said process.

Thus, one aspect of this invention relates to a process for producing a rubber composition comprising:

(A) an ethylene-α-olefin based copolymer rubber having an intrinsic viscosity [η] of 2.0–10.0 as determined in xylene at 70° C., (B) a softening agent, and (C) a filler, which process comprises the steps of:

(I) dividing component (A) into portions (A1) and (A2), dividing component (B) into portions (B1) and (B2), dividing component (C) into portions (C1) and (C2), and kneading portions (A1), (B1) and (C1) together to obtain a first blend, and (II) adding portions (A2), (B2) and (C2) to the first blend to obtain a second blend and kneading the second blend to obtain the rubber composition.

Another aspect of this invention relates to a rubber composition obtained by the above-mentioned process.

DETAILED DESCRIPTION OF THE INVENTION

Component (A) is an ethylene-α-olefin based copolymer rubber having an intrinsic viscosity [η] of 2.0–10.0 as determined in xylene at 70° C.

The "ethylene-α-olefin based copolymer rubber" herein refers to ethylene-α-olefin copolymer rubber or ethylene-α-olefin-non-conjugated diene copolymer rubber.

The α-olefin can be, for example, propylene, 1-butene, 1-pentene, 1-hexene, 4-methyl-1-pentene, 1-octene and 1-decene. Particularly preferred among them is propylene. The non-conjugated dienes can be, for example, chain-like non-conjugated diene, such as 1,4-hexadiene, 1,6-octadiene, 2-methyl-1,5-hexadiene, 6-methyl-1,5-heptadiene and 7-methyl-1,6-octadiene; cyclic non-conjugated dienes, such as cyclohexadiene, dicyclopentadiene, methyltetrahydroindene, 5-vinyl-2-norbornene, 5-ethylidene-5-norbornene-2-methanol, 5-methylene-5-norbornene-2-methanol, 5-isopropylidene-5-norbornene-2-methanol, and 6-chloromethyl-5-isopropenyl-5-norbornene-2-methanol; and trienes, such as 2,3-disopropylidene-5-norbornene-2-methanol, 2-ethylidene-3-isopropylidene-5-norbornene-2-methanol, 2-propenyl-2-norbomadiene, 1,3,7-octatriene and 1,4,9-decatriene. They can be used alone or in admixture of two or more of them. Particularly preferred among them are 1,4-hexadiene, dicyclopentadiene and 5-ethylidene-2-norbornene-2-methanol. The ethylene-α-olefin copolymer rubber or ethylene-α-olefin-non-conjugated diene copolymer rubber can be used as oil-extended rubbers containing extending oil.

The molar ratio of ethylene to α-olefin (ethylene/α-olefin) in Component (A) ranges preferably 40/60–90/10. The content of diene, when it is used, is not more than 20% of the total weight of ethylene, α-olefin and diene.

Component (A) has an intrinsic viscosity [η] of preferably 2.0–10.0, more preferably 2.5–5.0, as determined in xylene at 70° C. When the [η] is outside the above-mentioned range, the ultimately obtained rubber composition tends to be unsatisfactory in fatigue resistance.

Component (B) is a softening agent. The softening agent is not particularly limited and can be any softening agents which have been commonly used in the field of rubber industry, for example, petroleum-based materials, such as aromatic, naphthenic or paraffinic process oils, lubricant oils, paraffins, liquid paraffins, petroleum asphalts and vaselines; coal tars, such as coal tar and coal tar pitch; fatty oils, such as castor oil, linseed oil, rape seed oil and coconut oil; waxes, such as tall oil, factice, beeswax, carnauba wax and lanolin; and liquid diene-based polymers, such as liquid polybutadiene, modified liquid polybutadiene, liquid polyisoprene and hydrogenated liquid polyisoprene. The softening agents can be used each alone or in admixture of two or more of them.

Component (C) is a filler. The filler is not particularly restricted and can be any fillers which have been commonly used in the field of rubber industry, for example, carbon black; inorganic fillers, such as hydrated silica, anhydrous silica, talc, calcium carbonate, clay, titanium oxide, magnesium carbonate, magnesium oxide and aluminum hydroxide; and organic fillers, such as high styrene resin, coumarone-indene resin, phenol resin, lignin resin, modified melamine resin and petroleum resin. The fillers can be used either singly or in a combination of two or more thereof. From the viewpoint of obtaining good fatigue resistance, the use of carbon black is preferred. The carbon black include, for example, HAF, MAF, FEF and SRF black. Any of them can be used regardless of their reinforcing properties. The carbon black can be used each alone or in combination of two more kinds thereof, e.g., HAF together with MAF.

The process of this invention is a process for producing a rubber composition which comprises the following step (I) and step (II).

Step (I) is a step of dividing component (A) into portions (A1) and (A2), dividing component (B) into portions (B1) and (B2), dividing component (C) into portions (C1) and (C2), and kneading portions (A1), (B1) and (C1) together to obtain a first blend.

The proportion of portion (A1) used in step (I) ranges preferably 2–80% of component (A). When the proportion is outside the above-mentioned range, the rubber composition ultimately obtained is unsatisfactory with respect to fatigue resistance in some cases. The proportion of portion (B1) used in step (I) ranges preferably 2–95% of component (B). When the proportion is outside the above-mentioned range, the rubber composition ultimately obtained is unsatisfactory with respect to fatigue resistance in some cases. The proportion of portion (C1) used in step (I) ranges preferably 2–60% of component (C). When the proportion is outside the above-mentioned range, the rubber composition ultimately obtained is unsatisfactory with respect to fatigue resistance in some cases.

The kneading can be conducted with an apparatus conventionally used in the rubber industry, for example, an open roll, internal kneader and extruder. The conditions for kneading can also be conventional ones and are not particularly limited.

Step (II) is a step of adding portions (A2), (B2) and (C2) to the first blend to obtain a second blend and kneading the second blend to obtain the rubber composition. The kneading methods can be those enumerated for step (I).

Portion (A1) used in step (I) and portion (A2) used in step (II) can be the same or different from each other. In order to quantitatively express the amount of each of the components used, the amount of component (A), that is, the total amount of portion (A1) used in step (I) and portion (A2) used in step (II), is taken as 100 parts by weight. When an oil-extended rubber is used as component (A), the amount of component (A) refers to the amount thereof exclusive of the extending oil.

Portion (B1) used in step (I) and portion (B2) used in step (II) can be the same or different from each other. The amount of component (B), that is, the total amount of portion (B1) used in step (I) and portion (B2) used in step (II), ranges preferably 10–150 parts by weight, more preferably 20–80 parts by weight per 100 parts by weight of component (A). When the amount is outside the above-mentioned range, the rubber composition ultimately obtained is unsatisfactory with respect to fatigue resistance in some cases. When an oil-extended rubber is used as component (A), the amount of the extending oil is included in the amount of component (B).

Portion (C1) used in step (I) and portion (C2) used in step (II) can be the same or different from each other. The amount of component (C), that is, the total amount of portion (C1) used in step (I) and portion (C2) used in step (II) ranges preferably 10–150 parts by weight, more preferably 20–80 parts by weight per 100 parts by weight of component (A). When the amount is outside the above-mentioned range, the rubber composition ultimately obtained is unsatisfactory with respect to fatigue resistance in some cases.

The rubber composition of this invention can be blended, as occasion demands, with an organic polymer other than component (A). The blending of such an organic polymers can improve the fatigue resistance of the resultant rubber composition further. Specific examples of the organic polymer include natural rubbers, styrene-butadiene rubbers, chloroprene rubbers, acrylonitrile-butadiene rubbers, acryl rubbers and butadiene rubbers. Preferred of them are natural rubbers and styrene-butadiene rubbers. Either a single kind of organic polymer or two or more kinds of them can be blended with the rubber composition.

The rubber composition of this invention can be incorporated, according to necessity, with such compounding ingredients as processing auxiliaries, vulcanization accelerating auxiliaries and antioxidants.

The processing auxiliaries are not particularly restricted and can be those which have been conventionally used in the field of rubber industry, for example, fatty acids, such as oleic acid, palmitic acid and stearic acid; fatty acid metal salts, such as zinc stearate and calcium stearate; fatty acid esters; and glycols, such as ethylene glycol and polyethylene glycol. They can be used each alone or in admixture of two or more thereof.

The vulcanization accelerating auxiliaries are not particularly restricted and can be those which have been conventionally used in the field of rubber industry, for example, metal oxides, such as magnesium oxide, zinc oxide, litharge, red lead and white lead. Particularly preferred is zinc oxide. These vulcanization accelerating auxiliaries can be used alone or in admixture of two or more thereof.

The antioxidants are not particularly restricted and can be those which have been conventionally used in the field of rubberindustry, for example, aromatic secondary amine stabilizers, such as phenylnaphthylamine and N,N'-di-2-naphthylphenylene-diamine; phenol stabilizers, such as dibutyl-hydroxytoluenetetrakis[methylene(3,5-di-t-butyl-4-hydroxy)hydrocinnamate]methane; thioether stabilizers, such as bis[2-methyl-4-(3-n-alkylthiopropionyloxy)-5-t-butylphenyl]sulfide; and carbamic acid salt stabilizers, such as nickel dibutyldithiocarbamate. The antioxidant can be used either alone or in admixture of two or more thereof.

The rubber composition of this invention is usually vulcanized and used as a vulcanized rubber.

The vulcanizing agent used can be organic peroxides which have hitherto been used in the field of rubber industry, for example, 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy)hexane and 1,3-bis(t-butylperoxy-isopropyl)benzene. When an ethylene-α-olefin-non-conjugated diene copolymer rubber is used as the copolymer rubber (A), the vulcanizing agent can be, for example, sulfurs, such as powdered sulfur, precipitated sulfur, colloidal sulfur and insoluble sulfur; inorganic vulcanizing agents, such as sulfur chloride, selenium and tellurium; and sulfur-containing organic compounds, such as morpholine disulfide, alkylphenol disulfides, thiuram disulfides, and carbamic acid salts; which have hitherto been used in the field of rubber industry. These vulcanizing agents can be used each alone or as a mixture of two or more thereof. The amount of the vulcanizing agent used ranges preferably 0.1–10 parts by weight, more preferably 0.5–5 parts by weight, relative to 100 parts by weight of copolymer rubber (A).

The vulcanization accelerators are not particularly restricted and can be those which have been conventionally used in the field of rubber industry, for example, aldehyde ammonias, such as hexamethylene tetramine; guanidines, such as diphenyl-guanidine, di(o-tolyl)guanidine, and o-tolyl biguanide; thioureas, such as thiocarbanilide, di(o-tolyl)thiourea, N,N'-diethylthiourea, tetramethylthio-urea, trimethylthiourea, and dilaurylthiorea; thiazoles, such as mercaptobenzothiazole, dibenzothi-azole disulfide, 2-(4-morpholinothio)benzothiazole, 2-(2,4-dinitrophenyl) mercaptobenzothiazole, and (N,N'-diethylthiocarbamoylthio)benzothiazole; sulfenamides, such as N-t-butyl-2-(2-benzothioazolylthio)ethanol, N,N'-dicyclohexyl-2-(2-benzothioazolylthio)ethanol, N,N'-diisopropyl-2-(2-benzothioazolylthio)ethanol and N-cyclohexyl-2-(2-benzothioazolylthio)ethanol; thiurams, such as tetramethylthiuram disulfide, tetraethylthiuram disulfide, tetrabutylthiuram disulfide, tetramethyl-thiuram monosulfide, and dipentamethylenethiuram tetrasulfide; carbamic acid salts, such as zinc dimethyl dithiocarbamate, zinc diethyl dithiocarbamate, zinc di-n-butyl dithiocarbamate, zinc ethyl phenyl dithiocarbamate, sodium dimethyl dithiocarbamate, copper dimethyl dithiocarbamate, tellurium dimethyl dithiocarbamate, and iron dimethyl dithiocarbamate; and xanthogenic acid salts, such as zinc butyithioxan-thogenate. These vulcanization accelerators can be used each alone or as a mixture of two or more thereof. The amount of the vulcanization accelerator used ranges preferably 0.1–20 parts by weight, more preferably 0.2–10 parts by weight, relative to 100 parts by weight of copolymer rubber (A).

When an organic peroxide is used as the vulcanizing agent, a vulcanization auxiliary can be used in combination therewith as occasion demands. The vulcanization auxiliaries are not particularly restricted and can be those which have been conventionally used in the field of rubber industry, for example, sulfur and sulfur compounds, such as dipentamethylenethiuram tetrasulfide; multifunctional monomers, such as ethylene di(meth)acrylate, polyethylene di(meth)acrylate, divinylbenzene, diallyl phthalate, triallyl cyanurate, metaphenylene bismaleimide, and toluylene bismaleimide; and oxime compounds, such as p-quinone oxime and p,p'-benzoylquinone oxime. These vulcanization auxiliaries can be used alone or as a mixture of two or more thereof. The amount of the vulcanization auxiliary used ranges preferably not more than 10 parts by weight relative to 100 parts by weight of copolymer rubber (A).

In the vulcanization, it is necessary to carry out kneading with an open roll, internal kneader, extruder or the like at a temperature not higher than 120° C. so that the compounded vulcanizing agent may not begin to react. The vulcanization can be conducted by using a vulcanization apparatus conventionally used in the rubber industry, for example, a hot press and an injection machine. The vulcanization can be conducted at a temperature of usually not lower than 120° C., and preferably 140–200° C., for about 1–60 minutes.

The vulcanized rubber composition obtained by vulcanizing the rubber composition of this invention is favorably used as hoses, belts and vibration proof rubbers for automotive use and industrial use, where both good heat resistance and good fatigue resistance are required.

This invention is described in detail below with reference to Examples, but the invention is in no way limited thereto.

EXAMPLE 1

As step (I) shown in Table 1 below, an oil-extended EPDM (ethylene-propylene-5-ethylidene-2-norbornene copolymer rubber, molar ratio of ethylene/propylene: 78/22, 5-ethylidene-2-norbornene content: 4.5% by weight, Mooney viscosity $ML_{1+4}$ 125° C.: 60, $[\eta]$ in xylene at 70° C.: 2.6, with 40 parts by weight oil-extended rubber), FEF carbon black (Asahi 60G, a trade name, mfd. by Asahi Carbon) and paraffinic process oil (DIANA PW 380, a trade name, mfd. by Idemitsu Kosan Co., Ltd.) were placed in a Bambury mixer of 1.7-l inner volume in the amounts (part by weight) shown in the Table, respectively. The resulting mixture was kneaded at a starting temperature of 80° C. and a revolution number of 60 rpm for 5 minutes, to obtain a first blend. The "part by weight" shown in Table 1 refers to a value relative to 100 parts by weight of EPDM (the same applies hereinafter).

Then, as step (II), the first blend obtained above was cooled to room temperature, then thereto were further added the oil-extended EPDM used in step (I), FEF carbon black (Asahi 60G, a trade name, mfd. by Asahi Carbon), zinc oxide, stearic acid and a mixture of fatty acid-based synthetic resins (Structor 60NS, a trade name, mfd. by Schill & Seilacher), respectively, in the amounts (part by weight) shown in Table 1, and the resulting mixture was kneaded in the same manner as in step (I) mentioned above by using a Bambury mixer of 1.7-l inner volume at a starting temperature of 80° C. and a revolution number of 60 rpm for 5 minutes, to obtain the rubber composition.

The rubber composition obtained in step (II) was cooled to room temperature, then thereto were added dicumyl peroxide, sulfur and ethylene glycol dimethacrylate, respectively, in the amounts (part by weight) shown in Table 1, and the resulting mixture was kneaded by using an 8-inch open roll at 40–70° C. to obtain a pre-vulcanized rubber composition.

The viscosity of the pre-vulcanized rubber composition (compound) obtained through the above-mentioned steps was determined according to the method of JIS K 6300. The compound was formed into a vulcanized rubber sheet of 2 mm thickness by treating it with a hot press at 170° C. for 20 minutes. Further, the compound was formed into a right circular cylinder of 29 mm diameter and 12.5 mm thickness by using a vulcanizing mold, to serve as a specimen for compression permanent set determination.

The tensile test and compression permanent set test were conducted according to JIS K 6251 and JIS K 6262, respectively. The conditions of the tests are as follows.

Tensile Test

According to JIS K 6251, the tensile breaking strength (TB) and elongation at break (EB) were determined by using a JIS No. 3 dumb-bell test specimen at a stretching rate of 500 mm/min.

Compression Permanent Set

According to JIS K 6262, a Geer oven ageing tester was used at a test temperature of 150° C. to determine the compression permanent set after 70 hours of ageing.

Fatigue Resistance Test

By use of a constant load type rubber fatigue tester NRF 50–08 (mfd. by Infinite Nishi Co., Ltd.), 8 pieces of JIS No. 3 dumb-bell test specimen were subjected to repeated elongation at an ambient temperature of 40° C. and a load of 1.8 kg, to determine the number of repetition of elongation applied until break.

The results of the above tests are shown in Table 2 below.

Comparative Example 1

The same operations and evaluations as in Example 1 were carried out except that step (I) shown in Table 1 was not conducted, the kneading was conducted only on and after step (II), and the kneading time of step (II) was changed to 10 minutes. The results thus obtained are shown in Table 2.

Comparative Example 2

As step (I) shown in Table 1 below, the oil-extended EPDM used in Example 1 was adjusted to the amount (part by weight) shown in the Table, and was kneaded by using a Banbury mixer of 1.7-l inner volume at a starting temperature of 80° C. and a revolution number of 60 rpm for 5 minutes, to obtain a first blend.

Then, as step (II), the first blend obtained above was cooled to room temperature, then thereto were further added the oil-extended EPDM used in step (I), FEF carbon black (Asahi 60G, a trade name, mfd. by Asahi Carbon), paraffinic process oil (DIANA PW 380, a trade name, mfd. by Idemitsu Kosan Co., Ltd.), zinc oxide and a mixture of fatty acid-based synthetic resins (Structor 60 NS, a trade name, mfd. by Schill & Seilacher), respectively, in the amounts (part by weight) shown in the Table. The resulting mixture was kneaded in the same manner as in step (I) mentioned above by using a Banbury mixer of 1.7-l inner volume at a starting temperature of 8°° C. and a revolution number of 60 rpm for 5 minutes to obtain a comparative rubber composition.

The comparative rubber composition obtained in step (II) was cooled to room temperature, thereto were then added dicumyl peroxide, sulfur and ethylene glycol dimethacrylate, respectively, in the amounts (part by weight) shown in the Table, and the resulting mixture was kneaded by using an 8-inch open roll at 40–70° C., to obtain a pre-vulcanized rubber composition. Subsequent operations and evaluations were done in the same manner as in Example 1. The results thus obtained are shown in Table 2 below.

TABLE 1

| Composition (part by weight) | Example 1 | Comparative Example 1 | Comparative Example 2 |
| --- | --- | --- | --- |
| Step (I) | | | |
| Oil-extended EPDM | 28 | — | 28 |
| FEP carbon black | 10 | — | — |
| Paraffinic process oil | 10 | — | — |
| Step (II) | | | |
| Oil-extended EPDM | 112 | 140 | 112 |
| FEF carbon black | 40 | 50 | 50 |
| Paraffinic process oil | — | 10 | 10 |
| Zinc oxide | 5 | 5 | 5 |
| Stearic acid | 1 | 1 | 1 |
| Resin mixture | 2 | 2 | 2 |
| Vulcanization | | | |
| Dicumyl peroxide | 2.7 | 2.7 | 2.7 |
| Sulfur | 0.3 | 0.3 | 0.3 |
| Ethylene glycol dimethacrylate | 1.5 | 1.5 | 1.5 |

TABLE 2

| | Example 1 | Comparative Example 1 | Comparative Example 2 |
| --- | --- | --- | --- |
| Results of evaluation | | | |
| $ML_{1+4}$ 100° C. | 73 | 71 | 72 |
| TB (MPa) | 19.6 | 18.7 | 19.2 |
| EB (%) | 630 | 630 | 640 |
| Compression permanent set | 46 | 47 | 46 |
| Fatigue resistance Number of times till break | | | |
| n = 1 | >500000 | 146200 | 121700 |
| n = 2 | >500000 | 185500 | 204000 |
| n = 3 | >500000 | 282500 | 316200 |
| n = 4 | >500000 | 457200 | 408800 |
| n = 5 | >500000 | >500000 | >500000 |
| n = 6 | >500000 | >500000 | >500000 |
| n = 7 | >500000 | >500000 | >500000 |
| n = 8 | >500000 | >500000 | >500000 |
| Average of n = 1 – 8 | >500000 | >383925 | >381337 |

As explained above, according to this invention, there can be provided a process for producing a rubber composition comprising an ethylene-α-olefin based copolymer rubber as the rubber component which is excellent in heat resistance and fatigue resistance as well as a rubber composition obtained by the process.

What is claimed is:

1. A process for producing a rubber composition comprising:

(A) an ethylene-α-olefin based copolymer rubber having an intrinsic viscosity [η] of 2.0–10.0 as determined in xylene at 70° C.

(B) a softening agent, and (C) a filler, which process comprises the steps of:

(I) dividing component (A) into portions (A1) and (A2), dividing component (B) into portions (B1) and (B2), dividing component (C) into portions (C1) and (C2), and kneading portions (A1), (B1) and (C1) together to obtain a first blend, and (II) adding portions (A2), (B2) and (C2) to the first blend to obtain a mixture for second blend and kneading the second blend mixture to obtain the rubber composition.

2. The process according to claim 1, wherein the filler (C) is carbon black.

3. A rubber composition obtained by the process according to claim 1.

4. A vulcanized rubber composition obtained by vulcanizing the rubber composition according to claim 3.

* * * * *